May 14, 1935.   L. G. COX   2,000,926
PROTRACTOR
Filed March 22, 1933   4 Sheets-Sheet 1

LEO G. COX
INVENTOR

BY
ATTORNEY

LEO G. COX
INVENTOR

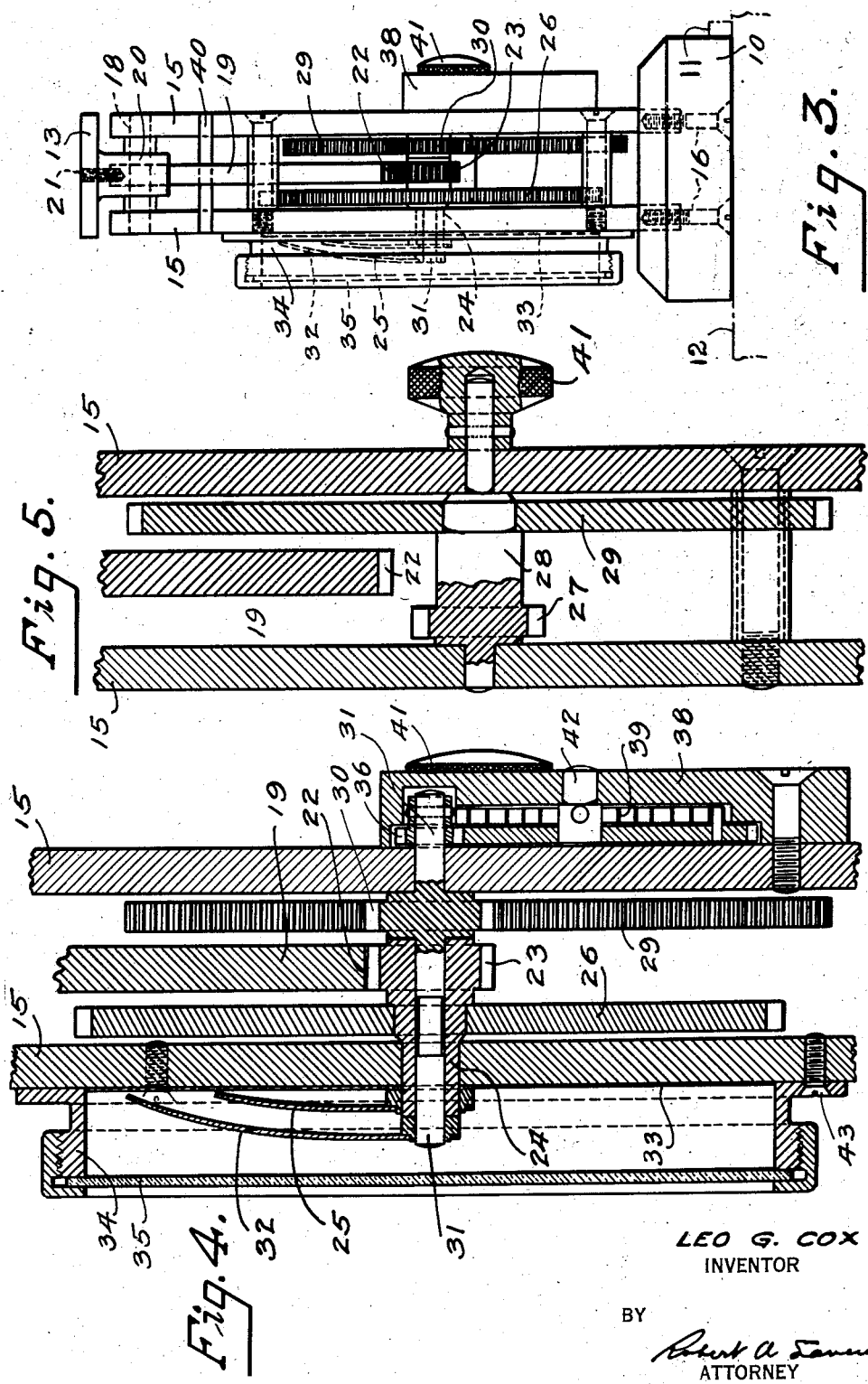

LEO G. COX
INVENTOR

Patented May 14, 1935

2,000,926

UNITED STATES PATENT OFFICE 2,000,926

PROTRACTOR

Leo G. Cox, Pensacola, Fla.

Application March 22, 1933, Serial No. 662,110

6 Claims. (Cl. 33—75)

(Granted under the act of March 3, 1883, as amended April 30, 1928; 370 O. G. 757)

My invention relates broadly to protractors, and more particularly to a protractor especially suited for measuring and reading the angular setting of aircraft propeller blades with relation to their hub.

The primary object of my invention is to provide a protractor that will permit accurate readings on a dial designated in degrees and minutes of the angular setting of adjustably mounted aircraft propeller blades.

Another object is to provide a protractor for quickly reading the results sought, by means of a plurality of index pointers.

It is also an object of my invention to provide a device that is rugged, light in weight, and one that requires very little skill in its operation for accurately determining the angular setting of adjustably mounted blades of aircraft propellers.

With the above and other objects in view, the invention consists in the construction, combination and arrangement of parts as will be described more fully hereinafter.

Reference is to be had to the accompanying drawings forming a part of this specification, in which like reference characters indicate corresponding parts throughout the several views, and in which:

Fig. 3 is an end view of my device with the protractor arm shown in a horizontal or zero position;

Fig. 4 is an enlarged detail vertical section taken on the line 4—4 of Figs. 1 and 2, showing the pointer shafts;

Fig. 5 is a detail vertical section taken on line 5—5 of Figs. 1 and 2, showing an arrangement of the setting knob and idler shaft;

Figure 1:
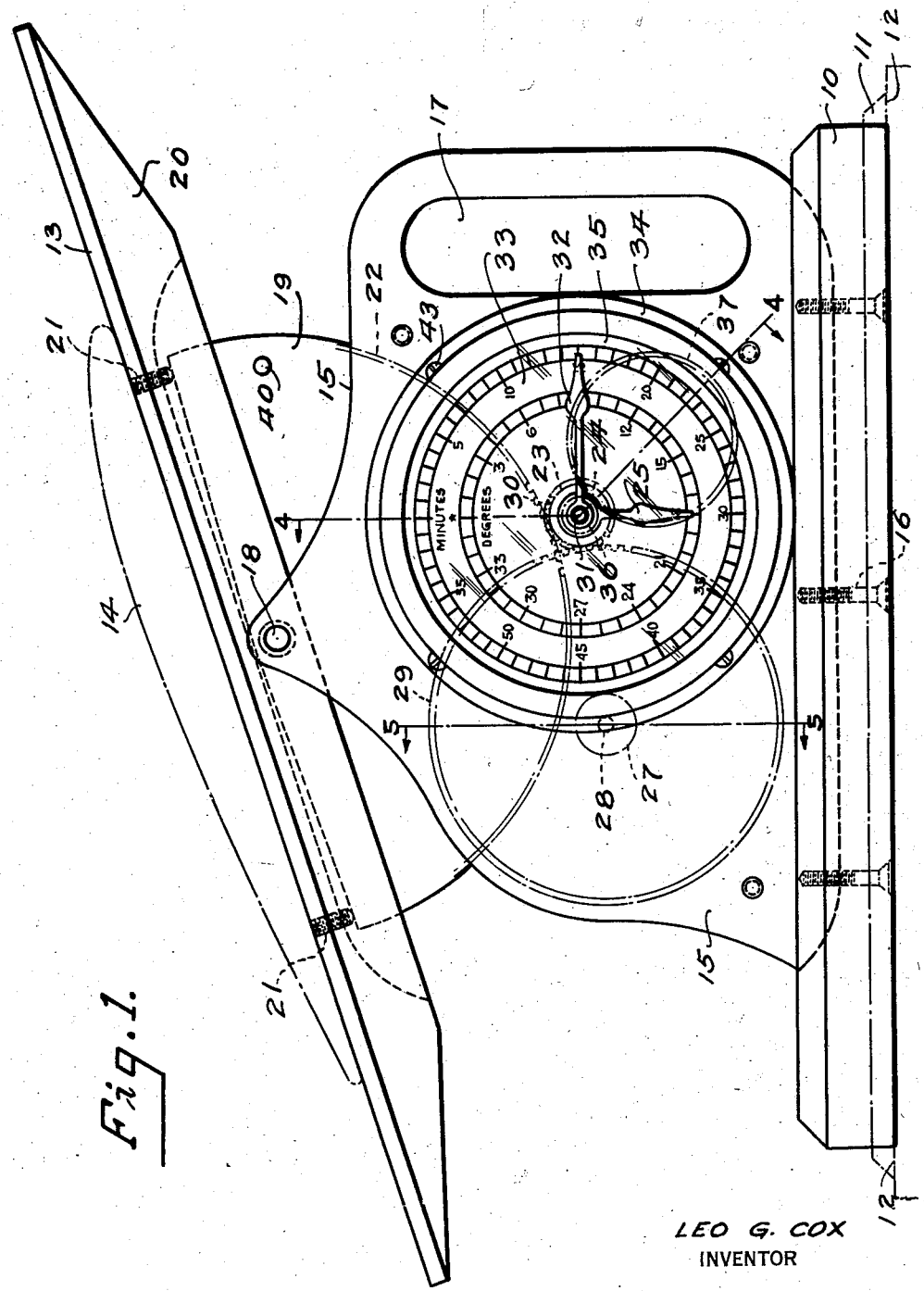
Fig. 1 is a front view of my improved protractor in position upon a test table and showing the relative location of an aircraft propeller blade.
Figure 2:
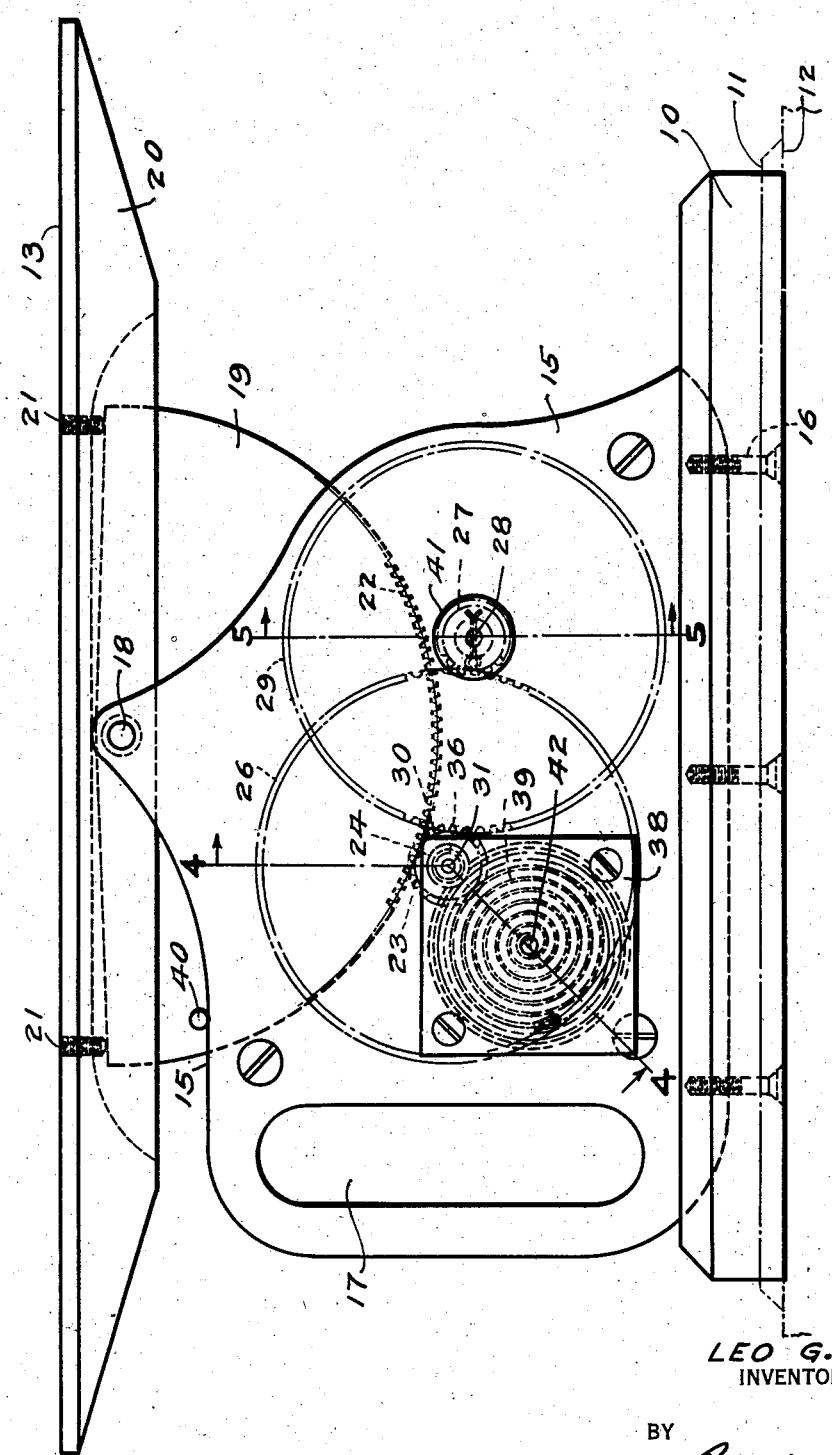
Fig. 2 is a rear view showing the blade engaging protractor arm in a horizontal or zero position.
Figure 6:
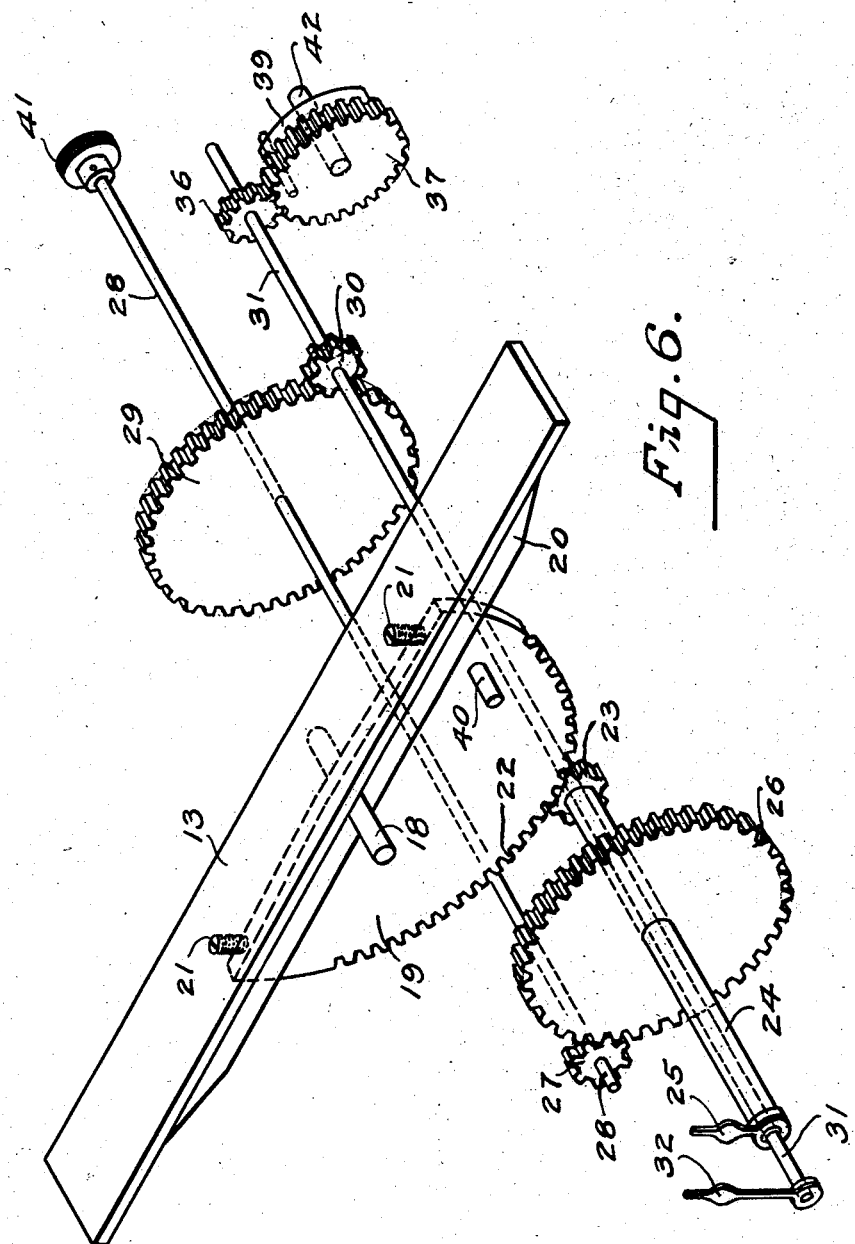
Fig. 6 is a diagrammatic illustration showing the arrangement of gears for moving the indicator hands.

Referring more particularly to the drawings, 10 indicates the base of a protractor, which has been placed against a guide strip 11 upon the top 12 of a test table, so that the protractor straight edge arm 13 may be adjusted against the blade 14 of an aircraft propeller (see Fig. 1). The customary practice is to take the angular setting of a standard propeller blade at approximately two-thirds the distance from the center line of thrust to the tip of the blade which is at a point about 42 inches from that center line, it being at this point that the guide strip 11 has been placed. Front and back plates 15 are secured to the base plate 10 by screws or the like 16 to form a rigid frame or housing for mounting the actuating mechanism. A hand grip is formed preferably by cutting out the openings 17 in the plates 15.

The straight edge arm 13 is pivotally mounted on a pin 18 that has its bearing surfaces in the plates 15. Also pivoted on pin 18 and positioned within a groove 50 formed on the under side of plate 13 by flanges 20 is the top portion of a sector plate 19 whose lower portion extends downward between plates 15. To set arm 13 parallel to base plate 10, I provide in the arm 13 set screws 21 that have their lower ends abutting the top of sector plate 19.

Gear teeth 22 are cut along a portion of the lower edge of the plate 19 and these teeth mesh with a pinion gear 23 secured to a sleeve shaft 24 which projects beyond the front plate 15. A pointer hand 25 for indicating degrees is forced on the end of the sleeve shaft 24. Rotary motion of sleeve 24 is transmitted through a spur gear 26 secured thereto and in mesh with a pinion gear 27 secured to an idler shaft 28 mounted for rotation in the plates 15. Another spur gear 29 is secured to the idler shaft 28 in mesh with a second pinion gear 30 mounted on a shaft 31 extending and free to rotate within the sleeve shaft 24. A minute hand 32 is forced on the front end of shaft 31. The ratio of movement for shaft 31 is geared so that it makes one complete revolution for each degree graduation on the dial. The shaft 28 extends through a bearing surface in the rear plate 15 and has a knurled knob 41 for manually transmitting a rocking motion by means of the meshed gears to the straight edge arm 13.

A dial ring 34 having a crystal 35 houses pointers 25 and 32 and the dial 33 which is mounted on the front plate 15 in any convenient manner as by means of screws 43.

To compensate for back-lash caused by play between the gear teeth and to provide means for returning the protractor straight edge arm 13 and pointers 25 and 32 back to zero setting, a pinion gear 36 is secured to shaft 31 which is placed in mesh with spur gear 37 mounted on a shaft 42 that is rotatably secured to a housing 38. One end of a spiral spring 39 is attached to spur gear 37 and the other end anchored to housing 38. This spring 39 causes the gears to rotate in counterclockwise direction until a stop 40 located upon sector plate 19 engages the edges of plates 15.

In the operation of the device it has been found preferable to slide the protractor along the guide strip 11 to a position under the blade by engaging the handle opening 17 with the left hand. The knurled knob 41, when rotated back and forth with the right hand, will cause through the meshed gears the straight edge arm 13 to seat itself firmly against the propeller blade 14 and the adjustment can be accomplished with very little practice on the part of the operator. As soon as the instrument is removed from the blade of the propeller, the reaction of back-lash spring 39 moves the protractor straight edge arm 13 to the horizontal position and immediately destroys the reading upon the dial. The propeller is then turned around to bring the second blade into position over the table, which blade is set by repeating the operation with the protractor and adjusted in the hub until the setting conforms to the reading of the angular setting of the first blade.

A great advantage of my invention in checking the angular setting of a propeller blade is that the measurements are taken by the feel of the protractor arm against the blade instead of depending entirely upon sight alone and it is no longer necessary to sight between the propeller blade and the protractor arm which would create a lack of accuracy and unavoidable discrepancies in the setting of the blades of a propeller exactly alike.

For the purpose of illustrating a blade setting, I have shown my improved device in Fig. 1 in engagement with a propeller blade having a pitch setting of 18 degrees, 15 minutes.

It has been found that propeller blades heretofore set by other methods and rejected upon test for excessive vibration, have been reset by the use of my improved protractor and returned to service and found to be satisfactory in operation.

It will be understood that the above description and accompanying drawings comprehend only the general and preferred embodiment of my invention and that various changes in construction, proportion and arrangement of parts may be made within the scope of the appended claims, without sacrificing any of the advantages of this invention.

The herein described invention may be manufactured and used by or for the Government of the United States for governmental purposes without the payment of any royalty thereon.

What I claim is:

1. In a protractor for checking the angular setting of propeller blades within their respective hub sockets while mounted upon a test stand, in combination, a base plate adapted to slide upon the stand, side plates projecting from said base plate, a blade engaging arm adapted to contact with the face of a propeller blade, said arm having a centrally located pivot pin located in bearings in said side plates, a toothed sector plate adjustably mounted with respect to said arm and projecting between said side plates, a dial graduated to degrees and minutes located exteriorly of one of said side plates, a plurality of pointers for said dial, a chain of ratio gearing between the shafts of said pointers and said sector plate, and manually operated means for imparting a rocking motion to said arm.

2. In a protractor for checking the angular setting of propeller blades while mounted upon a test stand, in combination, a base plate adapted to slide upon the stand, side plates projecting from said base plate, a blade engaging arm, a centrally located pivot pin on said arm having bearings in said side plates, a toothed sector concentrically mounted about said pivot pin and projecting between said side plates, a dial graduated to indicate degrees and minutes of angular setting of the blades, said dial being mounted upon one of said side plates, minute and degree hands for said dial, shafts for said hands located concentrically with respect to said dial, a chain of ratio gearing between said shafts and said sector for moving said arm, and a manually movable knob located upon one of the shafts of said chain of gearing for imparting motion to said arm.

3. In a protractor for checking the angular setting of propeller blades while mounted upon a test stand, in combination, a base plate adapted to slide upon the stand, a blade engaging arm, a centrally located pivot pin about which said arm may rock, side plates projecting above said base plate, said side plates provided with bearing apertures for said pivot pin, a toothed sector plate concentrically mounted about said pivot pin and projecting between said side plates, a dial having minute and degree graduations, minute and degree hands, shafts for said hands, a chain of ratio gearing for imparting motion between said sector and said shafts, and means for imparting rocking motion to said arm interposed within said chain of gearing.

4. In a protractor for determining the angular setting of propeller blades while undergoing checking tests upon a horizontal stand, in combination, a base plate adapted to slide upon the stand, a blade engaging arm, a centrally located pivot pin for said arm, side plates projecting from said base plate having bearing apertures for said pivot pins, a concentrically located toothed sector plate adjustably connected to said arm, a dial having degree and minute graduations, minute and degree hands, shafts for said hands, a chain of gearing for imparting motion between said sector and said shafts, and a manually operated knob attached to a shaft of one of the gears of said chain for imparting rocking motion to said arm and/or returning said hands and arm to zero position with respect to said dial.

5. In a protractor for determining the angular setting of a propeller blade while in position upon a flat level surface of a test stand, in combination, a base plate adapted to slide upon the flat level surface of the test stand, a blade engaging arm, side plates projecting from said base plate, a pin for said arm mounted in said side plates, a toothed sector plate for moving said arm connected concentrically to the pivot pin of said arm, means for adjusting said sector plate with respect to said arm, stop pins carried by said sector plate for limiting the movement of said arm, a dial for indicating the angular position of said arm, dual pointers for said dial, means comprising a chain of ratio gearing between the shafts of said pointers and said sector plate, and means interposed in said chain of gearing for imparting a rocking motion and/or returning the said arm and pointers to zero position with respect to said dial.

6. In a protractor for determining the angular setting of a propeller blade while in position upon a flat level surface of a test stand, in combination, a base plate adapted to slide upon the flat level surface of the test stand, a blade engaging arm, side plates projecting from said base plate, a pin for said arm mounted in said side plates, a toothed sector plate for moving said arm connected concentrically to the pivot pin of said arm, means for adjusting said sector plate with respect to said arm, stop pins carried by said sector plate for limiting the movement of said arm, a dial for indicating the angular position of said arm, dual pointers for said dial, means comprising a chain of ratio gearing between the shafts of said pointers and said sector plate, and means including a manually actuated knob mounted upon a shaft and interposed in said chain of gearing for imparting motion and/or returning said arm and pointers to zero position.

LEO G. COX.